US005247292A

United States Patent [19]

Nakanishi et al.

[11] Patent Number: 5,247,292

[45] Date of Patent: * Sep. 21, 1993

[54] SENSOR SIGNAL TRANSMISSION SYSTEM

[75] Inventors: Kouji Nakanishi, Asahi; Yoshitane Saito, Nagaokakyo, both of Japan

[73] Assignees: Nakamura Kiki Engineering Co. Ltd., Kyoto; Precision Industries Ltd. Kuroda, Kanagawa, both of Japan

[ * ] Notice: The portion of the term of this patent subsequent to Jun. 26, 2007 has been disclaimed.

[21] Appl. No.: 588,580

[22] Filed: Sep. 25, 1990

Related U.S. Application Data

[63] Continuation-in-part of Ser. No. 241,019, Sep. 2, 1988, abandoned.

[30] Foreign Application Priority Data

Sep. 30, 1987 [JP] Japan ............................ 62-247245

[51] Int. Cl.[5] ............................ H04Q 5/00

[52] U.S. Cl. ............................ 340/825.13; 340/825.06; 340/310 A

[58] Field of Search ........... 340/825.1, 825.11, 825.12, 340/825.13, 825.06, 825.62, 825.65, 825.67, 825.68, 505, 538, 870.39, 310 R, 310 A; 370/85.6

[56] References Cited

U.S. PATENT DOCUMENTS 4,093,946 6/1978 Fowler ............................ 340/505
4,164,730 8/1979 Weckenmann et al. ....... 340/825.11
4,320,502 3/1982 deVeer ............................ 370/85.6
4,408,185 10/1983 Rasmussen ..................... 340/310 A
4,520,488 5/1985 Houvig et al. ............ 340/870.39 X
4,694,293 9/1987 Sugiyama et al. ............ 340/825.68
4,937,568 6/1990 Nakanishi et al. ............ 340/825.06

*Primary Examiner*—Donald J. Yusko
*Assistant Examiner*—Edwin C. Holloway, III
*Attorney, Agent, or Firm*—McGlew and Tuttle

[57] ABSTRACT

A sensor signal transmission system for transmitting serially sensor signals produced in parallel by a plurality of sensors installed at a remote station to a central control station. The central control station includes a clock generating circuit, a signal conversion circuit for converting a voltage of a power supply source into clock-pulse superposed voltage signal, a start signal generating circuit, and a data extracting/converting circuit for detecting levels of an input signal to the central control station at the timing of the clock signal. The local station is connected to the central control station and signal includes a power generating circuit for generating a source voltage required for electrical energization of the sensors by smoothing the pulse superposed voltage signal. The clock pulses are modulated by the sensor state signals, which modulation is detected by the data extracting/converting circuit of the central station for evaluation or other processing thereof. The amount of wiring hardware can be significantly reduced, while high flexibility in system expansion can be assured.

12 Claims, 7 Drawing Sheets

SENSOR SIGNAL TRANSMISSION SYSTEM

The present application is continuation-in-part application of U.S. patent application Ser. No. 241,019 filed on Sept. 2, 1988 now abandoned.

CROSS REFERENCE TO RELATED APPLICATION

Reference is hereby made to the following application dealing with related subject matter and assigned to the assignees of the present invention:

1. "Remote Control System of Serial/Parallel Conversion Type" by K. Nakanishi et al, assigned U.S. patent application Ser. No. 237,387 and filed Aug. 26, 1988, and now matured to U.S. Pat. No. 4,937,568.

BACKGROUND OF THE INVENTION

1. Field of the Invention

The present invention generally relates to a signal transmission system for transmitting serially the signals generated in parallel. More specifically, the present invention is concerned with a sensor signal transmission system for transmitting serially to a central control station sensor signals generated in parallel by sensors installed at locations remote from the central control station for monitoring or supervising operations or states of devices, instruments, machines, electric or mechanical elements or the like which are to be monitored by the associated sensors, respectively.

2. Description of the Related Art

In the field of the automatic control techniques, there is employed widely such a signal transmission system in which control signals are transmitted from a central control station including a sequence controller, programmable controller, a computer or the like to a number of controlled devices such as electric motors, solenoids, electromagnetic valves, relays, thyristors, lamps and/or the like installed at locations remotely from the central control station for controlling the operations thereof, and in which the sensor signals indicating the states of the controlled devices (such as on/off state, positional displacement, angular positions, temperatures or the like) detected by sensor means such as reed switches, micro-switches, electronic switches, photoelectric detectors or the like bi-state (on/off-state) sensor elements are transmitted to the central control station for evaluation of the operating states of the controlled devices.

In conjunction with the transmission systems of the type mentioned above, there are a lot of such applications where the devices to be controlled are miniaturized and provided in a great number, being arrayed densely to one another, as a result of which a great difficulty is encountered in making access to the individual devices. Consequently, provision of individual control signal lines, clock signal lines, power supply lines and others between the control station and the devices to be controlled involves much labor, large space and high costs. Besides, maintenance is attended with very troublesome procedure.

As the typical examples of the device to be controlled, there may be mentioned an automated tool such as, for example, an industrial robot which is designed to be hydraulically or pneumatically controlled with the aid of electromagnetic valves also referred to as the solenoid valve. In most of such automated tools or robots, a so-called manifold solenoid valves unit incorporating integrally a number of solenoid valves is used for controlling hydraulically or pneumatically various parts of the tool with a view to reducing the space occupied by the valves. However, in order to remotely control the individual solenoid valves realized in the form of the manifold valve unit from a control station, a number of lines inclusive of the control signal lines, the power supply line and others have to be wired between the control station and the individual solenoid valves to be controlled, respectively, which of course requires high expenditure as well as a large space.

As an attempt for solving the problems of the prior art control/supervisory signal transmission systems such as described above, there can be mentioned a technique which is disclosed in U.S. patent application Ser. No. 237,387 filed under the title "REMOTE CONTROL SYSTEM OF SERIAL/PARALLEL CONVERSION TYPE" on Aug. 26, 1988 (now matured to U.S. Pat. No. 4,937,568 issued Jun. 26, 1990) and which is assigned to the assignees of the present application, the whole disclosure of which is herein incorporated by reference.

For having a better understanding of the invention, the remote control system disclosed in U.S. patent application Ser. No. 237,387 (U.S. Pat. No. 4,937,568) will be described by reference to FIGS. 7A and 7B of the accompanying drawings.

Referring to FIG. 7A, a reference numeral 10 denotes a central control station and a numeral 11 generally denotes a local station which comprises a start bit unit 12 and a conversion unit 13. In the central control station 10, data indicating a control command is externally inputted from a controller such as a sequence controller (not shown) to a parallel-to-serial (parallel/serial) conversion circuit 101 in the form of parallel data bits through an appropriate input unit (not shown). The parallel/serial conversion circuit 101 converts the input data bits into serial signal pulses under the timing commanded by a clock signal generated by a clock generating circuit 102. The serial signal pulses as generated are inputted to a signal conversion circuit 103 together with the clock pulses. The signal conversion circuit 103 serves for the function to superpose the serial data or signal pulses and the clock pulses on a D.C. power. The D.C. power superposed with the serial signal pulses and the clock pulses and outputted from the signal conversion circuit 103 is then sent out onto a line 104 as a serial output signal "OUT" which has such a waveform as shown in FIG. 7B at (a).

Additionally, the signal conversion circuit 103 is so designed as to generate a start signal "START" in synchronism with the start of the pulse train superposed as mentioned above. Refer to FIG. 7B at (b). The start signal is sent out onto a line 105 labeled "START". Incidentally, a reference numeral 106 denotes a ground potential line (GND).

The D.C. power outputted from the signal conversion circuit 103 thus assumes such a waveform as illustrated in FIG. 7B at (a). More specifically, a level $V_x$ represents the voltage level of the D.C. power (in volts), $V_{x/2}$ represents the voltage level corresponding to the command or control signal pulse of logic "0" level, and 0 (zero) represents the voltage level (zero volt) corresponding to the command or control signal pulse of logic "1", wherein the signal pulses of logic "1" and "0" levels are in synchronism with the clock pulses, respectively.

Upon reception of the pulse-superposed voltage "OUT" by the local station 11 via the line 104, a load driving power restoration circuit (PRC) 122 regenerates a power having a voltage level substantially equal to the level $V_x$ for energizing or driving devices or loads connected to output circuits 138, 139 by eliminating the pulse components from the input pulse-superposed voltage. The input pulse-superposed voltage is also applied to stabilized constant voltage power generating circuits or voltage converters (CVC) 121 and 131, whereby a constant voltage (having a level lower than $V_x$) is generated to be supplied as the source voltage to various constituent circuits of the local station, all of which are constituted by electronic circuits of low power consumption type. The output of the load driving power restoration circuit 122 is connected to a line $V_d$ which in turn is connected to power input terminals of the output circuits 138 and 139 to which the devices or loads (not shown) to be controlled are connected. The power line $V_d$ may additionally be connected to a terminal 124 of a D.C. power supply source for emergency so that the loads can be operated even when the power supply from the central control station 10 should be interrupted for some reason. A start signal detecting circuit 123 constituting a part of the start bit unit 12 and energized by the constant voltage power supply circuit (CVC) 121 detects the start signal st supplied via the signal line 105 in synchronism with a first pulse $t_1$ of logic "1" (see FIG. 7B at (b)). The detected start pulse st is supplied to a signal distribution circuit 133. On the other hand, a signal extracting circuit 132 connected to the power line 104 detects the superposed data signal pulses discriminatively with regard to the pulse levels to thereby output the clock pulses ck and data signal pulses of logic level "1" and "0" designated generally by dt.

The clock pulse ck is supplied to the signal distributing circuit 133 to allow the logic "1" pulse of the start signal st outputted from the start signal detecting circuit 123 to be inputted to the clock pulse distributing circuit 133, resulting in that the pulse of logic level "1" is produced from the output terminal Q1 of a first stage of the signal distribution circuit 133 to be applied to a clock input terminal CP of a latch circuit 134.

Thus, at the time $t_1$ when the leading clock pulse ck makes appearance, the first data pulse of logic "1" (pulse $t_1$ shown in FIG. 7B at (a)) inputted to a control pulse input terminal D of the latch circuit 134 is latched by the latter. As a result, an output signal is produced from an output terminal Q of the latch circuit 134 to thereby turn on the associated output circuit 138 which may be constituted by a switch. Consequently, the electric power generated by the power restoration circuit (PRC) 122 is supplied to the device to be controlled and connected to the output circuit 138 for electrically energizing the device, which may be a solenoid of an electromagnetic valve, an electric motor, a relay or the like, although not shown.

The pulse making appearance on the line 104 at a time point $t_2$ in the pulse train illustrated in FIG. 7B at (a) is logic "0". Consequently, the signal extracting circuit 132 produces as the output thereof the clock pulse ck and the data signal pulse dt of logic "0". The clock pulse ck is applied to the signal distributing circuit 133, as the result of which the data of logic "1" set at the first stage of the signal distributing circuit 133 at the preceding time point $t_1$ is shifted to a second stage of the circuit 133, whereby the data signal pulse of logic "1" is generated at an output terminal Q2 to be applied to the clock input terminal CP of a latch circuit 135. This results in that the signal pulse of logic "0" outputted from the signal extracting circuit 132 is latched and held by the latch circuit 135. At this time, no output signal is produced from the output terminal Q of the latch circuit 135. Accordingly, the output circuit 139 remains inoperative.

Simultaneously with the output of the clock pulse from the output terminal Q2 of the signal distributing circuit 133, a succeeding stage start signal generating circuit 137 is driven in response to the signal appearing at an output terminal Q2 of the signal distributing circuit 133, whereby the start signal is supplied to the succeeding conversion unit.

As will now be appreciated from the above description, the control data pulse train transmitted serially via the transmission line 104 undergoes serial/parallel conversion in the conversion unit 13 of the local station 11, whereby the output circuits 138 and 139 connected to the output side of the conversion unit 13 as well as those of the succeeding conversion unit (not shown in FIG. 7A) are set to the states of "ON", "OFF", "ON", "OFF" and "OFF", respectively, in response to the control data pulse train illustrated in FIG. 7B at (a) on the assumption that three output circuits and three latch circuits are provided in the succeeding conversion unit with the signal distribution circuit being constituted in three stages. The abovementioned state is held as it is until the next control data pulse train is issued from the central control station 10.

As is apparent from the above, the subject matter of U.S. patent application Ser. No. 237,387 (U.S. Pat. No. 4,937,568) is directed to the transmission system for transmitting the control signal from a central control station to the remotely located devices to be controlled. With the arrangement described above, the number of lines for transmission of various control signals and power can be significantly decreased. In other words, the various devices provided at remote stations can be controlled with a significantly reduced amount of wiring hardware. However, it is noted that the technique disclosed in U.S. patent application Ser. No. 237,387 (U.S. Pat. No. 4,937,568) is concerned only with the transmission of the control signals to the devices installed at remote locations through a power transmission line, and no consideration is paid to the transmission of sensor signals from the local stations to the central control station for the purpose of monitoring or supervising the operating states of the devices controlled at the central station side. In general, in the remote control system to which application of the technique disclosed in the recited reference is intended, it is indispensably required to monitor the states of the devices to be controlled with the aid of appropriate types of sensors, since otherwise the desired control can not be performed in a satisfactory manner. Thus, there exists a need for transmission of the sensor signals from the local stations to the central control stations for the purpose of evaluation of the operating states of the devices controlled. In this conjunction, transmission of the sensor signals should also be realized with a minimum number of lines (i.e. with a minimum amount of wiring hardware).

SUMMARY OF THE INVENTION

It is therefore an object of the present invention to provide an improved sensor signal transmission system in which the number of lines for transmission of various sensor signals and power can be significantly decreased.

In view of the above and other objects which will be apparent as description proceeds, there is provided according to a general aspect of the present invention a sensor signal transmission system for transmitting serially sensor signals produced in parallel by a plurality of sensors installed at a remote station to a central control station which incorporates a power supply source, wherein the central control station comprises a clock generating circuit for generating clock pulses at a predetermined timing, a signal conversion circuit for converting a voltage of the power supply source into a voltage signal superposed serially with the clock pulses at the predetermined timing generate a clock-pulse superposed voltage signal, a start signal generating circuit for generating a start signal, and a data extracting/converting circuit for detecting levels of a sensor state signal inputted to the central control station at the predetermined timing, while the local station is connected to the central control station via lines for the clock-pulse superposed voltage signal, the start signal and the ground potential and comprises a power generating circuit for generating a source voltage required for electrical energization of the sensors by smoothing the clock-pulse superposed voltage signal as received via the line for the clock-pulse superposed voltage signal, a start signal detecting circuit for detecting the start signal, a clock extracting circuit for extracting the clock pulses from the clock-pulse superposed voltage signal, and a clock pulse distributing circuit for distributing sequentially the extracted clock pulses to the sensors, respectively, in response to the start signal detected by the start signal detecting circuit, wherein the clock pulses are correspondingly modulated by sensor state signals representing the states of the sensors to which the clock pulses are distributed, respectively, to thereby generate the sensor state signal which is then detected by the data extracting/converting circuit of the central control station for evaluation processing of the states of the sensors.

In the sensor signal transmission system for transmitting various sensor signals to the central control station for evaluation of the operating states of the devices to be monitored, the clock signal including a series of clock pulses is sent from the central control station to the local station by way of a transmission line in superposition on the voltage, which local station is equipped with the sensors for monitoring the states of the controlled devices. In the local station, powers for driving the sensors and other circuits constituting the local station are restored with the clock signal being extracted. In accordance with the states of the sensors scanned at the timing of the individual pulses of the clock signal, voltage levels on the transmission line are modulated at the clock pulse positions such that the voltage assumes zero volt and $V_x/2$ volts in accordance with the sensor output of logic "1" (indicating, for example, the ON-state of the associated controlled device) and logic "0" (indicating the OFF-state), by way of example. The voltage levels are sequentially detected in synchronism with the clock signal in the central control station for evaluation or for the monitoring purpose.

These and other objects, advantages and attainments of the present invention will become apparent to those skilled in the art upon a reading of the following detailed description when taken in conjunction with the drawings.

BRIEF DESCRIPTION OF THE DRAWINGS

In the course of the following detailed description, reference will be made to the attached drawings, in which.

DESCRIPTION OF THE PREFERRED EMBODIMENTS

Now, the present invention will be described in detail in conjunction with preferred or exemplary embodiments thereof by reference to the accompanying drawings.

In the first place, description will be made of the basic concept underlying the sensor signal transmission system according to the present invention by referring to FIGS. 1A and 1B.

Figure 1A:
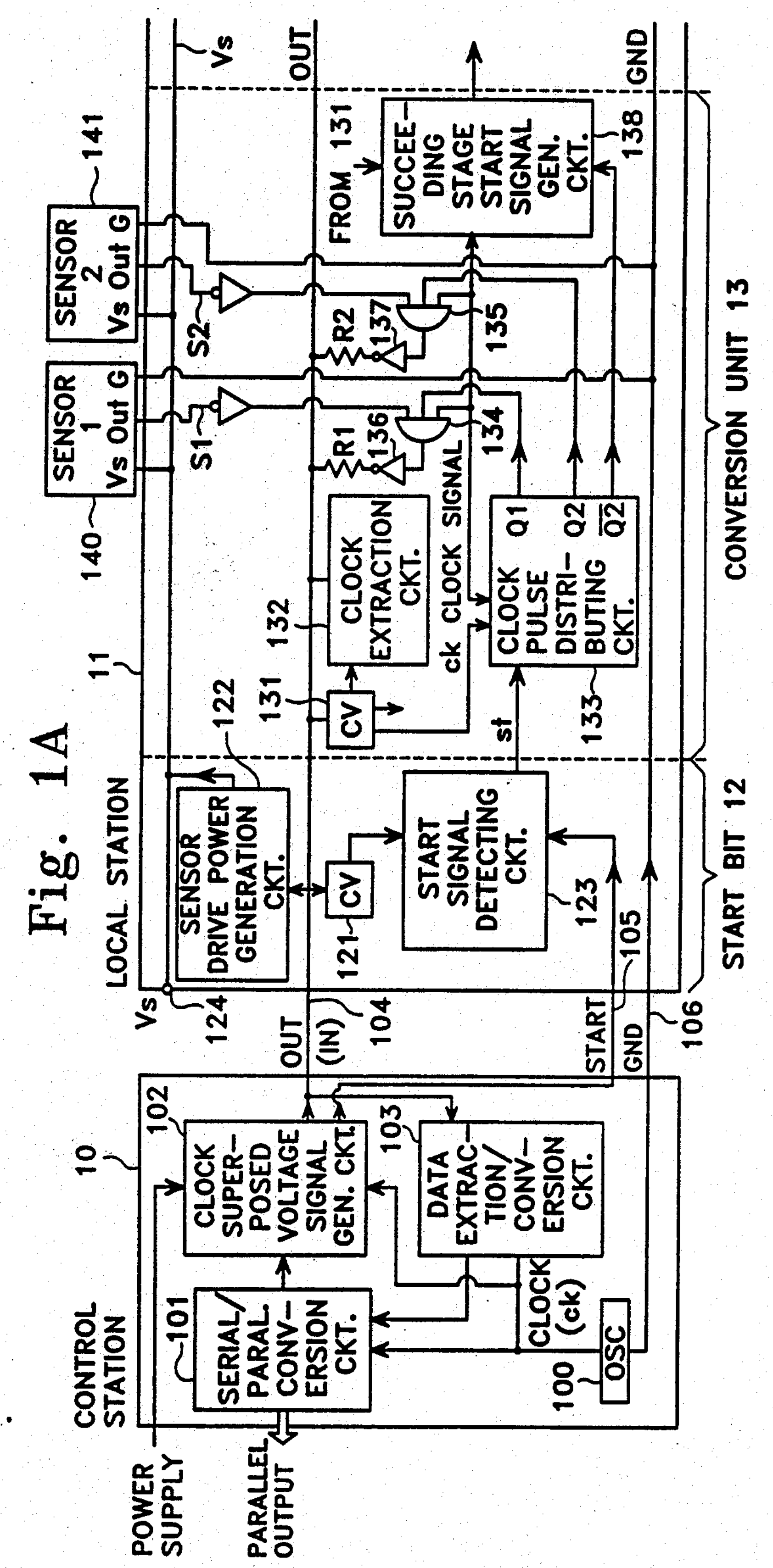
FIG. 1A is a block diagram showing a general arrangement of the sensor signal transmission system according to an exemplary embodiment of the present invention which may be applied to such a remote control system as described in conjunction with FIG. 7A and 7B.
Figure 7A:
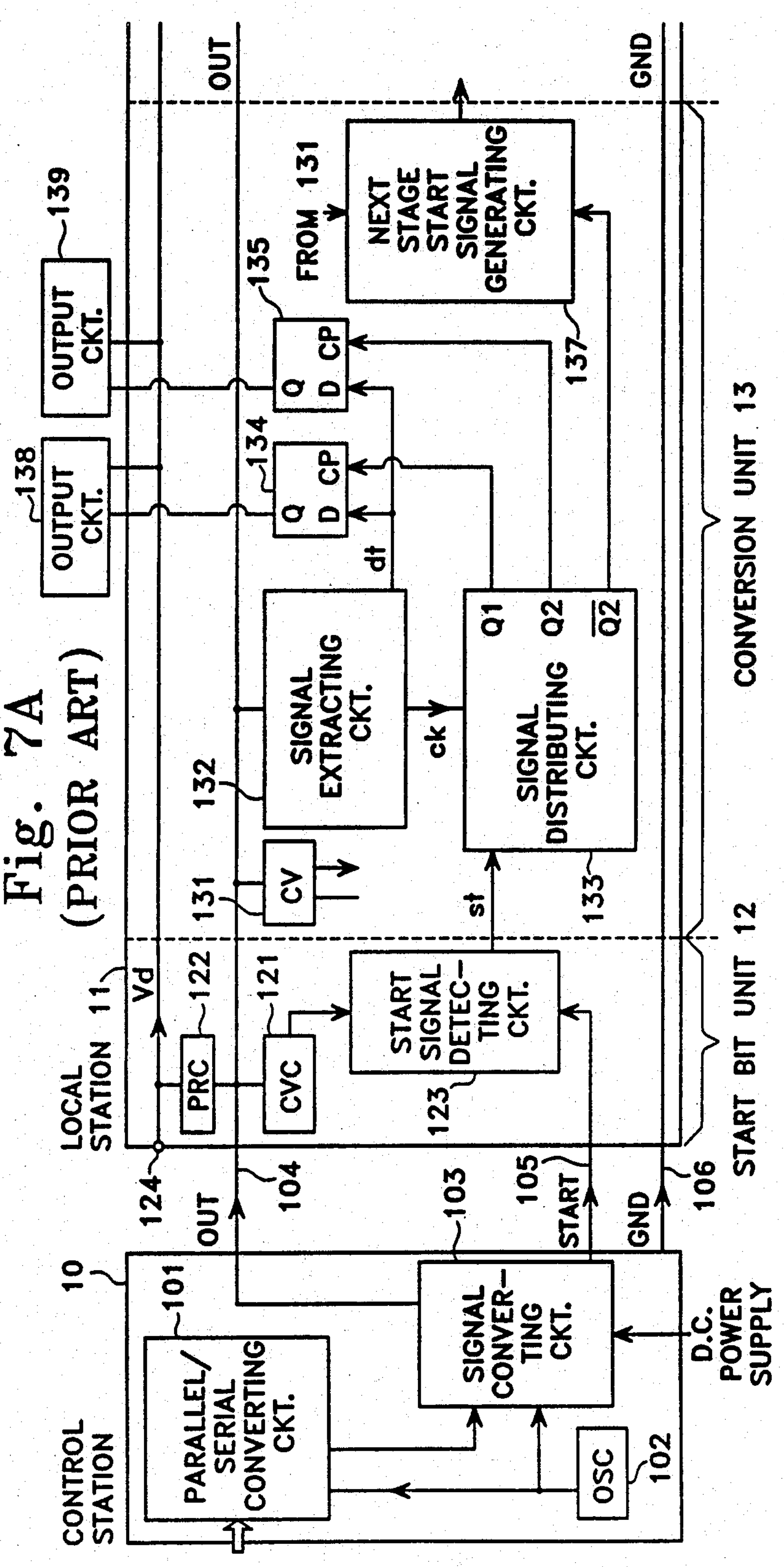
Fig. 7A (PRIOR ART)
FIGS. 7A and 7B are views for illustrating a remote control system according to the preceding application mentioned in the cross-reference.
Figure 7B:
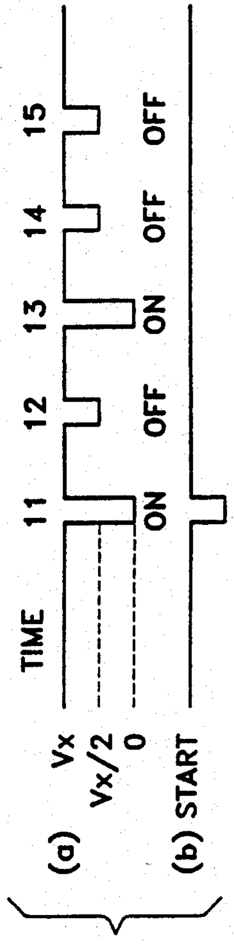
Fig. 7B (PRIOR ART)

In FIG. 1A, a reference numeral 10 denotes generally a central control station which includes a clock signal generator (OSC) 100, a serial-to-parallel (serial/parallel) conversion circuit 101, a clock-superposed voltage signal generation circuit 102 and a data extraction/conversion circuit 103. A reference numeral 11 generally designates a local station which includes a start bit unit 12 and a conversion unit 13. Although only one local station is shown in FIG. 1A, it should be understood that there can be provided a desired number of serially interconnected local stations in dependence on applications of the system. The start bit unit 12 includes a sensor drive power generation circuit 122 for generating from a transmission line 104 a sensor driving power for electrically energizing sensors 140, 141 provided at the local station 11 for the purpose of monitoring the operating states of devices such as those connected to the output circuits 138, 139 described hereinbefore in conjunction with FIG. 7A. The start bit unit 12 further includes a stabilized or constant voltage power generating circuit (CVC) 121 serving as a power supply source for driving electric or electronic components constituting the start bit unit 12, and a start signal detecting circuit 123. On the other hand, the conversion unit 13 includes a constant voltage power generating circuit (CVC) 131 serving as a power supply source for the various parts constituting the conversion unit 13, a clock extracting circuit 132 for extracting clock pulses, a clock pulse distributing circuit 133 constituted by plural stages of flip-flop circuits, as described hereinafter, and a succeeding stage start signal generating circuit 138 for generating a start signal to be applied to a succeeding local station. Further, the conversion unit 13 includes AND circuits 134 and 135 having outputs to which inverter circuits 136 and 137 are connected, respectively.

Describing briefly the operation of the illustrated system, a clock signal is supplied from the central control station 10 to the local station 11 by way of the transmission line (OUT) 104 which also serves for supplying a power to the local station 11. In the local station 11, the clock pulses are extracted from the transmission line 104 and distributed to the locations where the outputs of the sensors are connected, respectively. At the positions of the clock pulses, the voltage level on the transmission line 104 are modulated correspondingly in accordance with the outputs of the associated sensors, respectively. The modulated voltage levels which differ from one another in dependence on the output states of the associated sensors are detected at the central control station 10 for evaluating the operating states of the devices being monitored by the sensors.

More specifically, the clock pulses generated by the clock generator 100 which may be constituted by an oscillator known per se and an electric power of voltage $V_x$ applied externally from a suitable power supply source are supplied to the clock-superposed voltage signal generation circuit 102 which then modulates the amplitude of the source voltage $V_x$ with the clock pulses, as a result of which an output signal (OUT) representing the voltage $V_x$ superposed with the clock pulses is produced by the timing signal generation circuit 102. This output signal has such a waveform as shown in FIG. 1B at (a).

Figure 1B:
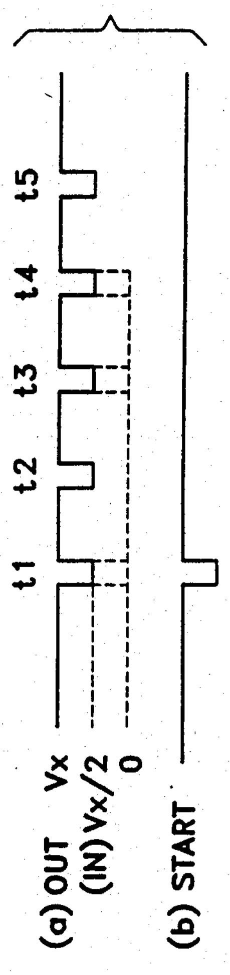
FIG. 1B is a signal waveform diagram for illustrating operation of the sensor signal transmission system shown in FIG. 1A.

A start signal (labeled START) having a waveform as shown in FIG. 1B at (b) is generated by the clock-superposed voltage signal line generation circuit 102 to be sent out onto a start signal line 105 in synchronism with the first or leading pulse (FIG. 1B at (a), $t_1$) of the clock pulse train superposed on the voltage $V_x$ of the transmission line 104. In FIG. 1A, a reference numeral 106 denotes a ground potential line (GND).

Thus, there makes appearance on the transmission line 104 a pulse-modulated voltage signal having a voltage level ($V_x/2$) during a period of each clock pulse, which level ($V_x/2$) differs from a voltage level ($V_x$) making appearance during the other periods than the pulse durations, as is shown in FIG. 1B at (a) in a solid line waveform.

On the other hand, in the local station 11, upon reception of the clock-pulse superposed voltage signal via the transmission line 104, the sensor drive power generation circuit 122 generates a sensor driving voltage $V_S$ of a value substantially equal to that of the voltage $V_x$ for energizing the sensors 140 and 141 (SENSOR 1, SENSOR 2), while the stabilized constant voltage generating circuits 121, 131 generate a voltage of a lower amplitude than that of the voltage $V_x$ for driving the individual electric or electronic circuitries (such as the start signal detecting circuit 123, the clock extracting circuit 132 and others) which constitute the start bit unit 12 and the conversion unit 13. In a preferred embodiment, the power line $V_S$ may additionally be connected to a terminal 124 of a D.C. power supply source for emergency so that the sensors can be operated even when the power supply from the central control station 10 should be interrupted for some reason.

The start signal detecting circuit 123 of the start bit unit 12 energized by the constant voltage power supply circuit (CVC) 121 detects the start signal supplied via the signal line (START) 105 in synchronism with the leading or first pulse ($t_1$) (see FIG. 1B). The detected start pulse st is supplied to the clock pulse distribution circuit 133 which is constituted by first and second stages of a shift register.

On the other hand, the clock extracting circuit 132 connected to the transmission line 104 detects the superposed clock pulse signal (FIG. 1B at (a)) to thereby output the detected clock pulse ck.

The clock pulse ck outputted from the clock extracting circuit 132 is applied to the clock pulse distributing circuit 133, and at the same time the logic "1" pulse outputted from the start signal detecting circuit 123 is inputted to the first stage of the shift register constituting the clock pulse distribution circuit 133, resulting in that the pulse of logic level "1" is produced from the output terminal Q1 of the first stage of the clock pulse distribution circuit 133 to be applied to a first input of the AND circuit 134. At that time point, there is applied to a second input terminal of the AND circuit 134 the clock pulse ($t_1$) of logic "1". The AND circuit 134 has a third input terminal to which the output signal (binary signal of logic "1" or "0") is applied from the sensor 140. According, assuming that the output signal of the sensor 140 is logic "1" at the time point mentioned above, the AND circuit 134 produces logic "1" output, resulting in that the pulse signal of the ground potential level is sent out onto the signal line 104 by way of the inverter circuit 136 and the resistor R1.

Consequently, the signal level of the clock-pulse superposed voltage signal OUT is set to the ground potential level (zero volt) during the period $t_1$ as indicated by a phantom line in FIG. 1B at (a). This level transition is detected as the state of the sensor 140 at the central station in a manner which will be described hereinafter. On the other hand, assuming that the output of the sensor 140 is logic "0", the signal level during the clock duration $t_1$ will remain as it is (i.e. at $V_x/2$).

When the second pulse makes appearance on the line 104 in succession to the first pulse, i.e. when the pulse makes appearance at the time point $t_2$ in the case of the pulse train illustrated in FIG. 1B at (a), the clock extracting circuit 132 produces as the outputs thereof the clock pulse ck which is applied to the clock pulse distributing circuit 133, as the result of which the state of logic "1" set at the first stage of the clock pulse distributing circuit 133 at the preceding time point $t_1$ is shifted to the second stage of the circuit 133, whereby the pulse of logic "1" is generated at the output terminal Q2 to be applied to the AND circuit 135 together with the clock pulse ck from the clock pulse extracting circuit 132. Thus, when the output of the second sensor 141 applied to the other input terminal of the AND gate 135 at this time point is logic "0", the AND gate 135 outputs logic "0", resulting in that no influence is exerted to the pulse train on the line 104. Thus, the signal level on the transmission line 104 remains unchanged during the clock pulse duration $t_2$, as can be seen from FIG. 1B at (a).

At the central control station 10, the clock-superposed voltage signal generation circuit 102 generates the clock pulse train indicated by the solid line in FIG. 1B at (a) and at the same time detects the signal levels representing the states of the first and second sensors 140 and 141 and supplied serially from the local station 11 via the signal line 104 and the ground potential line 106 as indicated by a reference symbol (IN) attached to the line 104. More specifically, the data extraction/conversion circuit 103 detects the levels on the signal line 104 during the periods of the individual clock pulses to produce the output of logic "1" when the level as detected is lower than $V_x/2$ while otherwise producing the output of logic "0".

Thus, at the time points $t_1$ and $t_2$, the data extracting/converting circuit 103 of the central control station 10 outputs the logic levels of "1" and "0", representing the states of the sensors 140 and 141, respectively, which are then supplied to the serial/parallel conversion circuit 101 to be latched and shifted sequentially to the succeeding stages at the timing of the clock signal.

In the transmission system shown in FIG. 1, the conversion unit 13 of the local station 11 is so configured as to detect the states of the two sensors 140 and 141. It goes however without saying that a desired number of the conversion units each of the structure similar to that described above may be provided serially in cascade to the conversion unit 13. To this end, the succeeding stage start signal generating circuit 138 is provided and connected to the output terminal Q2 of the clock pulse distributing circuit 133 for supplying the start signal to the succeeding stage of the conversion unit.

As will now be appreciated from the above description, the clock pulses transmitted serially to the local station 11 via the transmission line 104 undergoes, so to say, the amplitude or level modulation in the conversion unit 13 in dependence on the output states of the sensors designated by the clock pulses, respectively, whereby the pulses having levels of "0", "1", "1", "0" and so forth representing the sensor state information, respectively, are generated at the position of the clock pulses and can be detected at the timing of the clock signal in the central control station 10.

It should be added that the line 105 dedicated to the transmission of the start signal can be spared. In that case, the start signal may be transmitted via the signal/power transmission line 104, wherein the level of the start signal is differentiated from those of the clock pulses or alternatively the pulse width of the start signal may be differentiated from that of the clock pulses so that the former can be discriminated from the latter. Since such technique is within the skill of those having ordinary knowledge in this field, there will be no need for any further description in this connection.

Figure 2:
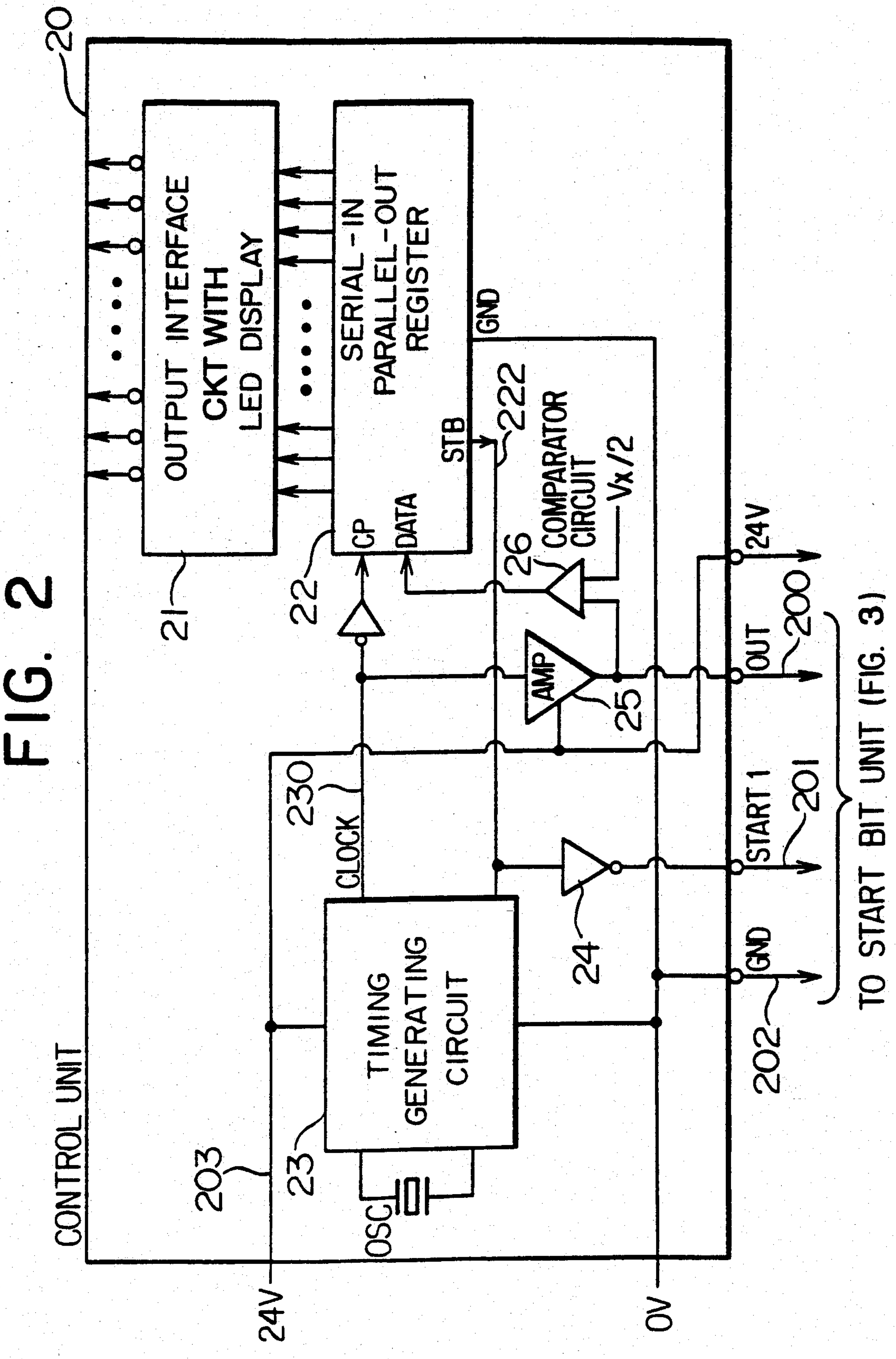
FIG. 2 is a circuit diagram showing a circuit configuration of a central control station employed in the sensor signal transmission system shown in FIG. 1A.
Figure 3:
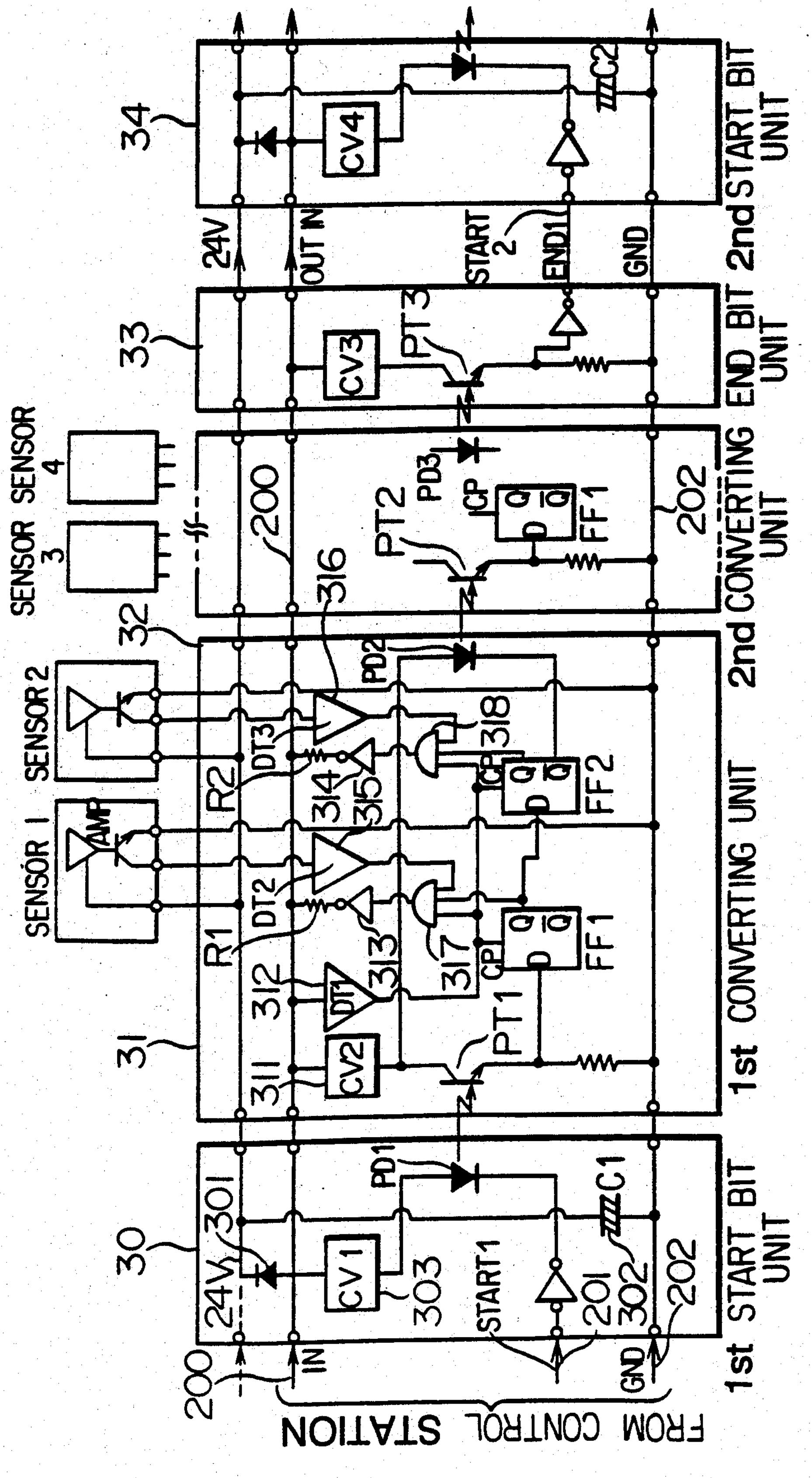
FIG. 3 is a circuit diagram showing a circuit configuration of a local station equipped with sensors and employed in the system shown in FIG. 1A.
Figure 4:
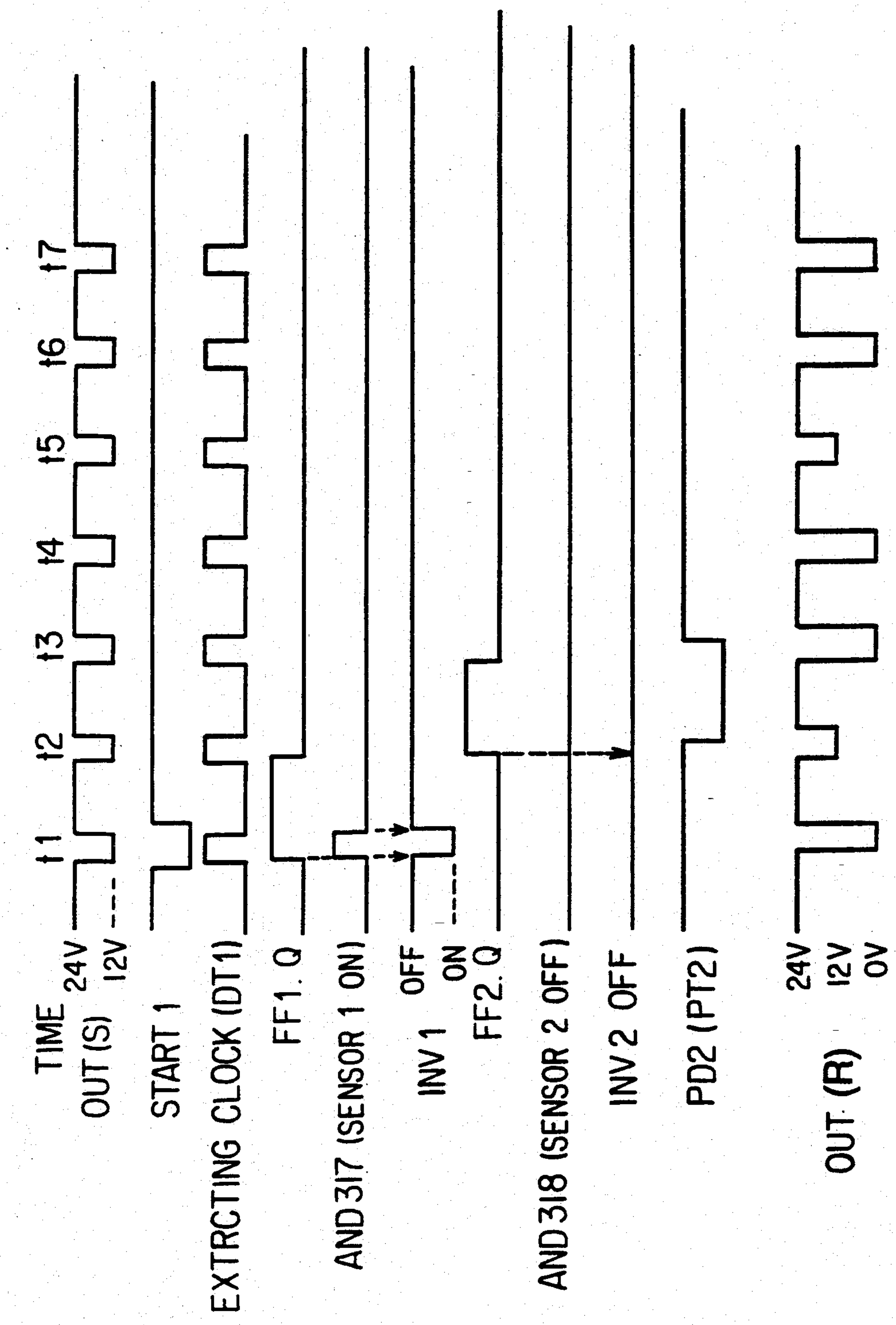
FIG. 4 shows a timing chart for illustrating operations of the sensor signal transmission system.

Next, description will be made in detail of the structures and operations of the central and local stations by reference to FIGS. 2, 3 and 4, in which FIG. 2 shows in more concrete a circuit arrangement of the central control station, FIG. 3 shows that of the local station, and FIG. 4 is a waveform diagram for illustrating the operation of the sensor signal transmission system, Referring to FIG. 2, the central control station denoted by a reference numeral 20 in this figure includes an output interfere circuit 21 (incorporating an LED display array) for supplying the detected sensor state information to a computer or other processing apparatus provided externally although it is not shown. The LED display array serves to allow the operator to visually recognize the states of the sensors and hence the associated devices being monitored. Further, the central control station 20 comprises a serial-in/parallel-out shift register 22, a timing or clock generator circuit 23, amplifiers 24 and 25 and a comparison circuit 26.

In FIG. 3, a reference numeral 30 denotes a first start bit unit corresponding to that denoted by 12 in FIG. 1A, a numeral 31 denotes a first conversion unit corresponding to that designated by 13 in FIG. 1A and equipped with a sensors 1 and 2, a numeral 32 denotes a second conversion unit having sensors 3 and 4 and implemented in the same structure as the first conversion unit 31, a reference numeral 33 denotes an end bit unit, and a numeral 34 denotes a second start bit unit. Reference symbols CV1 to CV4 represent constant voltage generating circuits, respectively, which correspond to those denoted by 121 and 131 in FIG. 1A. Further, FF1 and FF2 denote flip-flop circuits, respectively, 312 denotes a clock signal detection circuit (DT1), 313 and 314 denote inverter circuits, respectively, and 315 and 316 denote sensor output detection circuits (DT2, DT3), respectively.

Connected serially to the central control station 20 shown in FIG. 2 are the individual units 30, 31, 32, 33 and 34 shown in FIG. 3 which constitute parts of the local stations via a serial signal transmission line 200 (corresponding to the line 104 shown in FIG. 1A), a start bit signal line 201 (corresponding to the start signal line 105 shown in FIG. 1A) and a ground potential level signal line 202 (corresponding to the line 106 shown in FIG. 1A).

Now, operation of the sensor signal transmission system will be described by reference to the waveform diagram of FIG. 4, in the course of which functional and/or structural correspondences between the parts shown in FIG. 1A and those shown in FIGS. 2 and 3 will become apparent.

At first, description is directed to the operations taking place in the central control station 20 shown in FIG. 2.

The clock generator circuit 23 generates clock pulses at a predetermined timing from the output of the oscillator OSC (designated by 100 in FIG. 1A). The clock pulses are then supplied to the serial-in/parallel-out shift register 22 and the mixer amplifier 25 which receives as the other input thereto a DC voltage (e.g. of 24 volts) from a power supply line 203 to thereby modulate the DC voltage level with the clock pulses 230, whereby the pulse superposed voltage signal OUT(S) is generated, as shown in FIG. 4 at a row labeled "OUT(S)", to be outputted onto the signal transmission line 200. The mixer amplifier 25 thus constitutes a part of the clock superposed voltage signal generating circuit 102 shown in FIG. 1A. Parenthetically, "(S)" of the label "OUT(S)" represents that the superposed pulses are original or source clock pulses whose levels are to be modified in dependence on the outputs of the sensors which are designated by these clock pulses, respectively. As can be seen in FIG. 4, the signal OUT(S) has a level, for example, of 12 volts during the duration or pulse width of each clock pulse, while assuming a level, for example, of 24 volts during the other period intervening between the clock pulses.

The serial-in/parallel-out shift register 22 receives the clock signal 230 at a clock terminal CP while receiving the sensor state pulses at a data terminal DATA, which are detected by a comparison circuit 26 having one input terminal connected to the transmission line 200 (104 in FIG. 1A) and the other input terminal connected to a reference voltage level of $V_x/2$, wherein the sensor state pulses are serially shifted sequentially at the timing of the clock signal 230. Thus, it will be apparent that the comparison circuit 26 constitutes the data extraction/- conversion circuit 103 shown in FIG. 1A while the serial-in/parallel-out shift register 22 constitutes the serial/parallel conversion circuit 101 shown in FIG. 1A and has parallel outputs connected to the parallel inputs of the output interface circuit 21, as shown in FIG. 2. Further, the serial-in/parallel-out shift register 22 is so designed as to generate the start signal (START) from a terminal STB in synchronism with the clock signal 230 every time a cycle for collecting the state data from the individual sensors is started (i.e. at every time point the first pulse $t_1$ shown in FIG. 4 and FIG. 1B at (a) is generated in succession to completion of the data collection cycle). The timing for generating the start signal can be determined in dependence on the bit position of the serial-in/parallel-out shift register 22 at which the last pulse of the pulse train consisting of a predetermined number of the data pulses representing the states of the associated sensors, respectively, has arrived after having undergone the shift operation in the shift register 22. The start signal thus generated from the terminal STB is then amplified through an amplifier 24 to be sent out onto the start signal line 201 (105 in FIG. 1A). It will be noted that the number of the clock pulses $t_1$, $t_2$, . . . and so forth contained in one pulse train may correspond to that of the sensors provided in the local station. In this manner, the states of the sensors can be repetitively and circulatively collected for the monitoring purpose in a consecutive manner.

The pulse superposed voltage signal OUT(S) generated by the central control station 20 is supplied to all the units belonging to the local station connected in cascade between the signal line 200 (104 in FIG. 1A) and the ground potential line 202 (106 in FIG. 1A). Referring to FIG. 3, each of the constant voltage generating circuits CV1 to CV4 is constituted by a Zener diode, a capacitor and a resistor in a well known manner to supply a source voltage for energizing the components constituting each unit. On the other hand, the sensor driving power regenerating circuit 122 described hereinbefore in conjunction with FIG. 1A is constituted by a diode 301 and a capacitor 302, as shown in FIG. 3.

The start signal is applied to a terminal START of the first start bit unit 30 shown in FIG. 3 (12 in FIG. 1A), resulting in that a light emission diode PD1 emits light, in response to which a phototransistor PT1 of the first conversion unit 31 outputs a pulse signal of logic "1" from the emitter thereof. The light emission diode PD1 and the phototransistor PT1 constitute the start signal detection circuit 123 shown in FIG. 1A. The logic "1" pulse outputted from the phototransistor PT1 is applied to a data input terminal D of the flip-flop circuit FF1 constituting a first stage of the clock pulse distribution circuit 133 shown in FIG. 1A. At this time point, a clock pulse detection signal is outputted from a clock pulse detection circuit (DT1) 312 which may be constituted, for example, by a threshold circuit known per se and serves for the function of the clock pulse extraction circuit 132 shown in FIG. 1A and is applied to a clock terminal CP of the flip-flop FF1. Consequently, the latter assumes the set state in which the logic "1" level is outputted from the output terminal Q (refer to FIG. 4 at a row labeled "Q OF FF1").

The sensors can generally be implemented in various structure in dependence on the objectives or devices to be monitored. As a typical one of the structure, the sensor may be constituted by a sensor amplifier Amp whose output is connected to a collector of a transistor, as shown in FIG. 3.

Parenthetically, the sensors are shown to be provided separately for the conversion unit 1. However, this is only for the purpose of illustration, and they can in practice be implemented in an integral unit which may thus be called a sensor unit with parallel-in/serial-out converter.

Turning back to FIG. 3, the output of the first sensor 1 is detected by a detector circuit (DT2) 315 to be applied to one input of the AND circuit 317 (corresponding to the AND circuit 134 in FIG. 1A), which has two other inputs terminals to which the clock pulse CP and the Q-output of the flip-flop circuit FF1 are applied, respectively. Accordingly, when the sensor output applied to the AND circuit 317 is logic "1" indicating, for example, "ON" state of the associated device to be monitored, the output of the AND circuit 317 becomes logic "1". This output of logic "1" is inverted by the inverter (NOT) circuit 313 to be subsequently applied to the signal line 200, as the result of which the voltage level thereof is set to zero (the ground potential level) during the pulse duration of logic "1" outputted from the AND circuit 317 (i.e. during the pulse period or width of the clock pulse $t_1$). This level transition is detected at the central control station as the sensor output data of the first sensor 1.

More specifically, the inverter circuit 313 (as well as the inverter circuit 314) is implemented in an open-collector circuit configuration. When this inverter circuit 313 is turned on as mentioned above, the voltage on the signal line 200 is set to a level approximating zero volt. The resistor R1 serves to protect the inverter circuit 313 (314) against destruction due to the voltage of 24 volts which makes appearance on the signal line 200 except for the durations of the clock pulses. More specifically, a loop composed of the signal line 200, the clock signal detection circuit 312, the AND circuit 317 and the inverter circuit 313 is locked at the level (12 volts) of the clock signal cp and protected against the voltage of 24 volts appearing on the signal line 200 by impedance presented by the resistor R1.

Thus, there takes place the level transition at the time point $t_1$, as shown in FIG. 4 at a row labeled "OUT(R)", where "(R)" indicates that the level transition signal are to be received or detected at the central control station as the sensor state signal. The level transition signal OUT(R) is coupled to one input terminal of the comparison circuit 26 of the central control station 20 to be compared with the reference signal level $V_x/2$ (12 volts) applied to the other input terminal. When the former is zero volt (see FIG. 4, row "OUT(R)", $t_1$), the comparison circuit 26 outputs a pulse of logic "1" which is inputted to the serial-in/parallel-out shift register 22 to be held at the first bit position therein.

At the time point $t_2$, the flip-flop circuit FF1 incorporated in the first conversion unit 31 responds to the application of the succeeding clock pulse derived through the detector circuit 312 to the terminal CP by transferring the Q-output of logic "1" to the flip-flop circuit FF2 constituting the other part of the clock pulse distributing circuit 132 shown in FIG. 1A. As a result of this, the Q-output level of the flip-flop circuit FF2 becomes logic "1". On the other hand, the D-input of the flip-flop circuit FF1 is logic "0" because the phototransistor PT1 is in the off-state at this time point. Consequently, the Q-output of the flip-flop circuit FF1 is logic "0", whereby the AND circuit 317 is now disabled.

The Q-output of logic "1" of the flip-flop circuit FF2 is inputted to the AND circuit 318 (designated by 135 in FIG. 1A) simultaneously with the clock pulse CP of logic "1", whereby the AND circuit 318 is enabled to allow the output of the second sensor 2 to pass therethrough. Now assuming that the sensor output of concern detected by the detection circuit (DT3) 316 is logic "0", the output of the AND circuit 318 is logic "0", resulting in that the output of the inverter circuit 314 assumes the same level as the clock pulse. Consequently, the signal level on the signal line 200 at the time point $t_2$ remains unchanged (refer to FIG. 4, the row "OUT(R)", $t_2$).

When the Q-output of the flip-flop circuit FF2 becomes logic "1" in response to the second clock pulse at the time $t_2$ (with $\overline{Q}$-output thereof being logic "0"), a light emission diode LD2 which constitutes the succeeding stage start signal generating circuit 138 shown in FIG. 1A is electrically energized to thereby turn on the phototransistor PT2 of the succeeding or second conversion unit 32. However, since the clock pulse at $t_2$ has disappeared at this time point, the flip-flop circuit FF1 as well as the second conversion unit 32 does not operate. Only upon reception of the third clock pulse $t_3$, the flip-flop circuit FF1 of the second conversion unit 32 is set, whereby the operation similar to that described previously in conjunction with the conversion unit 31 is performed. As a result, the outputs of the third and fourth sensors 3 and 4 assumed to have logic levels "1" and "1", respectively, are produced on the signal line 200 (refer to FIG. 4, the row "OUT(R)", $t_3$ and $t_4$) and detected by the comparison circuit 26 of the central control station to be sequentially placed in the serial-in/parallel-out shift register 22 of the central control unit 20 with the preceding state data of the sensors 1 and 2 being correspondingly shifted in respect to the bit positions.

Turning to FIG. 3, the end bit unit 33 is connected in succession to the second conversion unit 32. At this juncture, it should be mentioned that in the case of the illustrative embodiment, the start bit unit 30, the first conversion unit 31 and the second conversion unit 32 are optically coupled through the combination of the light emission diode and the photodiode on the assumption that these units are disposed closely to one another to constitute a first local station, so to say. The end bit unit 33 is provided in order to allow a second local station to be serially connected to the first local station through electrical coupling rather than the photoelectric coupling. By virtue of this feature of the present invention, the second local station may be installed at a place remote from the first station, whereby capability as well as flexibility of the system expansion can be enhanced. To this end, the end bit unit 33 includes a phototransistor PT3 which is turned on in response to the radiation of the light emission diode LD2 of the second conversion unit 32. The output of the phototransistor PT3 is applied to a terminal labeled "END1" through an amplifier. The terminal END1 may be connected through wiring to a terminal START2 of a second start bit unit 34 of the second local station which may be implemented in a structure similar to that of the first local station. Of course, the second start bit unit 34 is of the same structure as the first start bit unit 30. In FIG. 4, the sensor state data pulses shown at $t_5$, $t_6$ and $t_7$ are generated by the conversion unit or units provided in succession to the second start bit unit 34 through the process described hereinbefore.

In the case of the illustrative embodiment described above, the start bit unit 30, the first and second conversion units 31 and 32 and the end bit unit 33 are operatively connected through optical couplings each realized by the light emission diode and the phototransistor. It should however be understood that the invention is not restricted to such arrangement. A direct connection by using a connector plug, by way of example, can equally be adopted.

The local station including the units 30, 31, 32 and 33 shown in FIG. 3 can be installed in a desired number by connecting additionally a corresponding number of the stations in cascade. This expansion capability features an aspect of the present invention.

In an experiment, it has been found that the sensor signal transmission system operates satisfactorily with the clock pulse signal having a duration of 4/μsec. and a pulse repetition period of 32/μsec.

Figure 5:
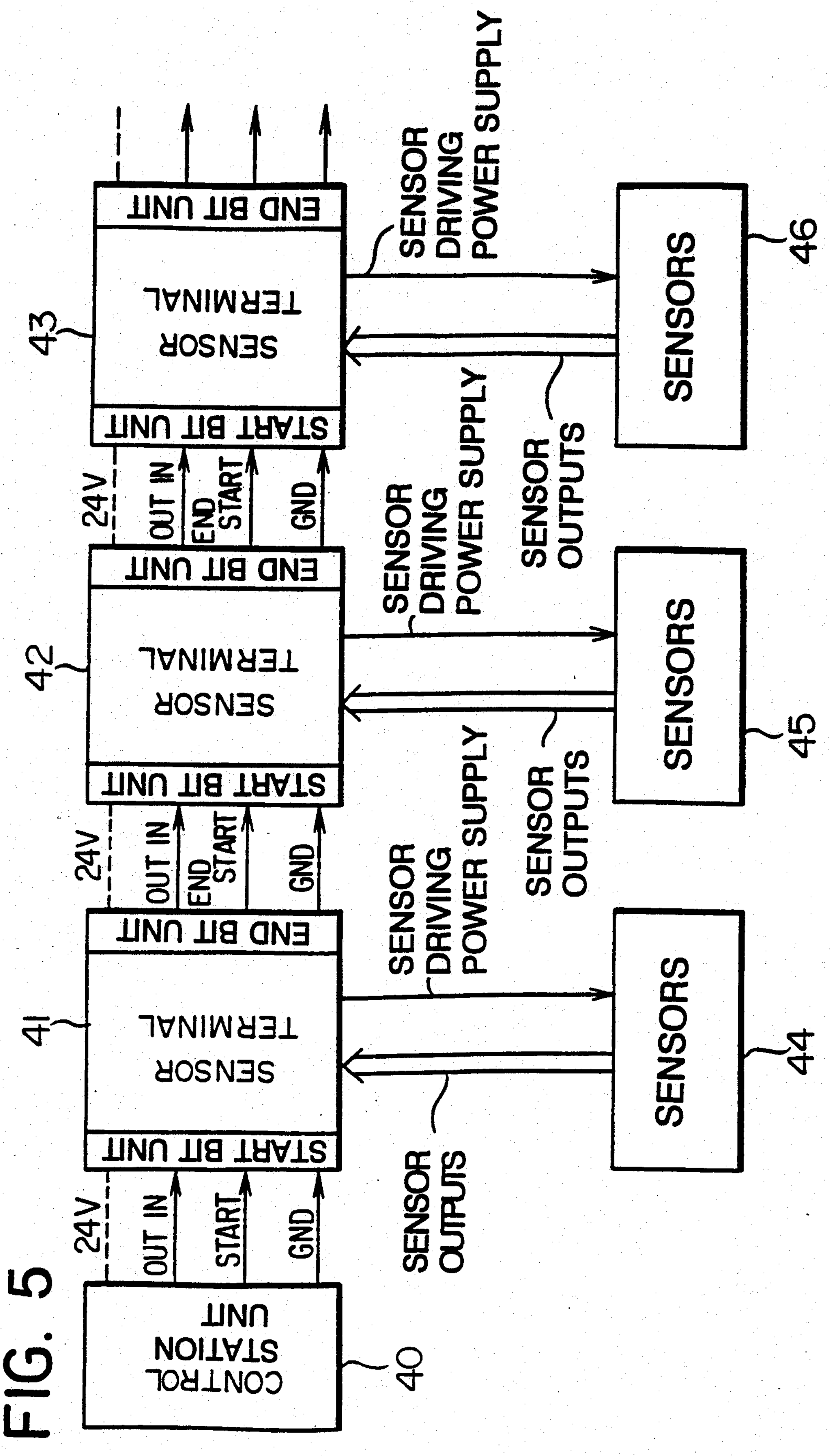
FIG. 5 is a schematic block diagram showing a practical application of the present invention.

FIG. 5 shows, by way of example, an application of the present invention. More specifically, FIG. 5 is a block diagram showing schematically an arrangement of the inventive sensor signal transmission system applied to an industrial robot system. In the figure, the control unit 40 constitutes the central control station and has a structure shown in FIG. 2. Each of the local stations 41, 42, 43 is constituted by one start bit unit, the sensor terminal integrally combined with the conversion unit and one end bit unit. A desired number of the sensor terminals can be monitored by connecting the local stations in cascade without need for increasing the number of the lines interconnecting the central control station and the local stations.

Figure 6:
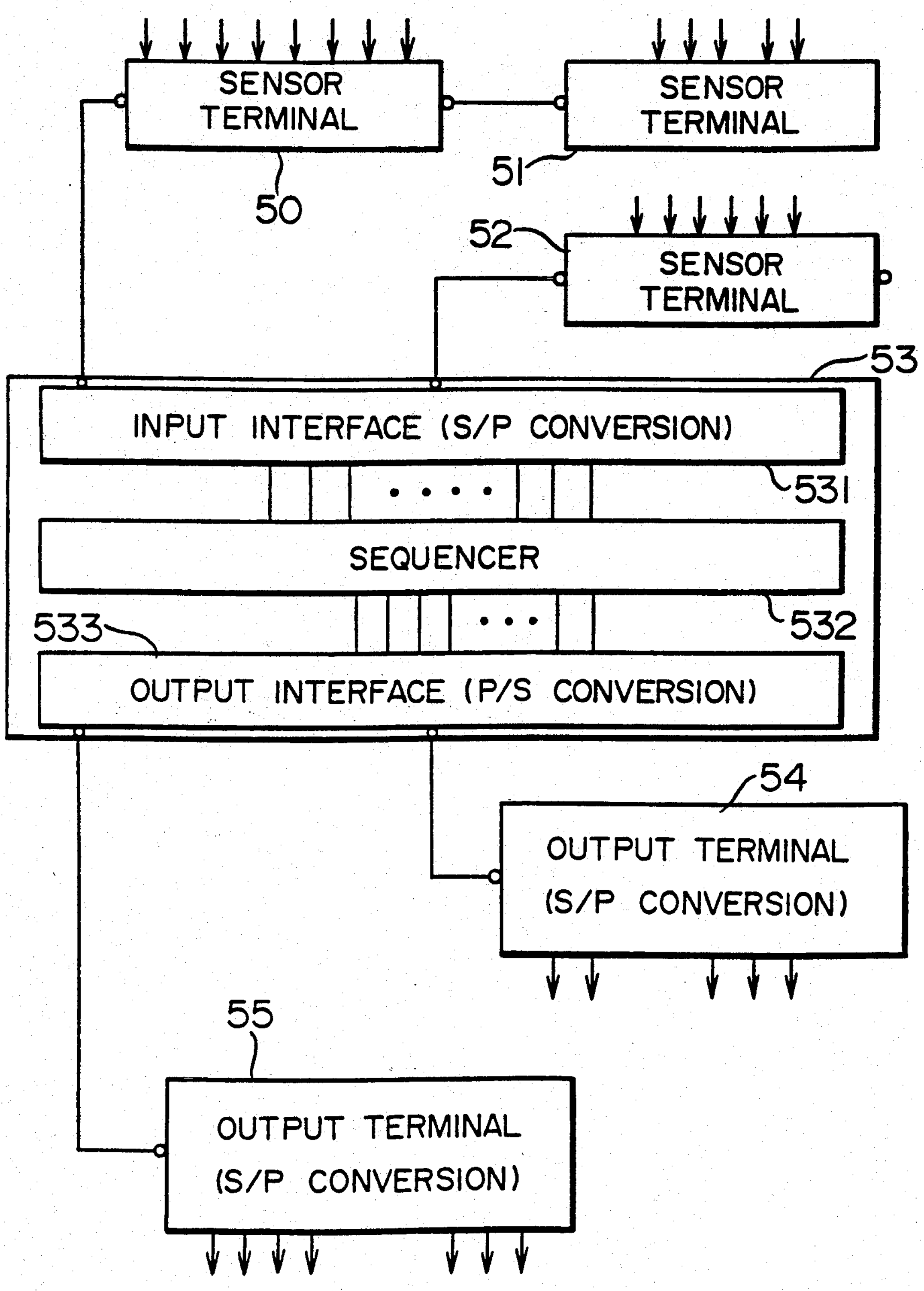
FIG. 6 is a schematic diagram showing another example of application of the present invention.

Another application of the invention is shown in FIG. 6, by way of example only.

In FIG. 6, reference numerals 50, 51 and 52 denote sensor terminals, respectively, 53 denotes a control unit or the central control station, and numerals 54 and 55 denote output terminals, respectively.

Signals generated by individual sensors and indicating the states of associated devices are inputted in parallel to the associated sensor terminals 50 to 52, respectively, which are then transmitted serially to the control unit (central control station) 53. At the control unit 53, the serial signal is converted into a parallel signal through an input interface (for serial/parallel conversion) 531 to be inputted to a sequencer 532. The sequencer 532 in turn outputs drive signals in a sequence programmed in accordance with the contents of the input signal, the output signals being supplied in parallel to an output interface (for parallel/serial conversion) 533.

The output interface 533 converts the parallel inputs to a serial signal which is supplied to the associated output terminals 54, 55, etc., respectively.

As will be appreciated from the foregoing description, it is possible according to the teaching of the present invention to monitor the states of a number of devices to be supervised with the number of the wiring lines being decreased to a possible minimum. By virtue of this feature, a large number of the devices to be monitored can be installed within a narrow space while the labor as well as expenditure involved in the wiring can remarkably be reduced.

Many features and advantages of the present invention are apparent from the detailed specification and thus it is intended by the appended claims to cover all such features and advantages of the system which fall within the true spirit and scope of the invention. Further, since numerous modifications and changes will readily occur to those skilled in the art, it is not desired to limit the invention to the exact construction and operation illustrated and described. Accordingly, all suitable modifications and equivalents may be resorted to, falling within the scope of the invention.

We claim:

1. A sensor signal transmission system for transmitting serially sensor signals produced in parallel by a plurality of sensors installed at a remote station to a central control station which incorporates a power supply source, said central control station comprising:

clock generating means for generating clock pulses at a predetermined timing;

signal conversion means for converting a voltage of said power supply source into a voltage signal superposed serially with said clock pulses at said predetermined timing to generate a clock-pulse superposed voltage signal;

start signal generating means for generating a start signal; and data extracting/converting means for detecting levels of a sensor state signal inputted to said central control station at said predetermined timing;

said remote station being connected to said central control station via lines for said clock-pulse superposed voltage signal, said start signal and the ground potential and comprising:

power generating means for generating a source voltage required for electrical energization of said sensors by smoothing said clock-pulse superposed voltage signal as received via said line for said clock-pulse superposed voltage signal;

start signal detecting means for detecting said start signal;

clock extracting means for extracting said clock pulses from said clock-pulse superposed voltage signal;

clock pulse distributing means for distributing sequentially said extracted clock pulses to said sensors, respectively, in response to said start signal detected by said start signal detecting means;

clock pulse modulation means for modulating clock pulses by sensor state signals representing the states of the sensors to which said clock pulses are distributed, respectively, to thereby generate said sensor state signal and transmitting means for transmitting said sensor state signal to said data extracting/converting means for detecting said sensor state signal by said data extracting/converting means of said central control station for evaluation processing of the states of said sensors, said transmitting means being connected to said data extracting/converting means via said lines for said clock pulse superposed voltage signal.

2. A sensor signal transmission system as set forth in claim 1, wherein said signal conversion means generates a DC voltage which assumes a first substantially constant level during periods except for durations of said clock pulses, said DC voltage assuming a second level differing from said first substantially constant level during the durations of said clock pulses while assuming a third level differing from said first and second levels in dependence on the output states of said sensors during the duration of said clock pulses, respectively.

3. A sensor signal transmission system as set fourth in claim 2, wherein said clock pulses modulated in respect to the level thereof in dependence on said output states of said sensors have the ground potential level as said third level in dependence on the output states of said sensors.

4. A sensor signal transmission system as set fourth in claim 2, wherein said clock pulse extracting means extracts said clock pulses from said clock-pulse superposed voltage signal through comparison thereof with a predetermined level corresponding to said DC voltage.

5. A sensor signal transmission system as set fourth in claim 1, wherein said clock pulse distributing means includes a shift register having a plurality of output stages connected to output circuits of said sensors, respectively, said clock pulses extracted by said clock pulse extracting means being sequentially shifted through said shift register in response to said start signal so that said clock pulses are distributed to sensor output circuits to be thereby modulated with the output states of said sensors, respectively.

6. A sensor signal transmission system as set fourth in claim 5, wherein each of said output stages includes a flip-flop set in response to said start signal, and a NAND gate having input terminals supplied with the set output of said flip-flop, the clock pulse extracted by said clock pulse extracting means and the output of the sensor to which said clock pulse is distrubuted and an output terminal coupled to said line for said clock pulse superposed voltage signal.

7. A sensor signal transmittion system as set fourth in claim 1, wherein said local station includes a plurality of blocks each including said start signal detecting means for detecting said start signal, at least one conversion unit for regenerating the clock pulses to be modulated with the output of said sensors and an end bit unit for generating said start signal to be supplied to a succeeding block.

8. A sensor signal transmission system as set forth in claim 7, wherein each of said blocks is provided with connectors at an input side and connectors at an output side, respectively, said connectors providing an interconnection of input and output sides of adjacent said blocks.

9. A sensor signal transmission system as set fourth in claim 8, wherein each of said connectors is realized through a combination of a light emission diode and a phototransistor.

10. A sensor signal transmission system as set fourth in claim 1, wherein said local station includes power generating means for generating from said clock-pulse superposed voltage signal electric power utilized both for electrically driving said sensors and for electrically energizing the circuit components incorporated in said local station.

11. A sensor signal transmission system as set fourth in claim 1, wherein said start signal generated by said start signal generating means of said central control station is imparted with a voltage level which can be discriminated from that of clock pulses to thereby allow said start signal to be transmitted through the same line as that for said clock-pulse superposed voltage signal for allowing the line dedicated for said start signal to be spared.

12. A sensor signal transmission system as set fourth in claim 1, wherein said data extracting/converting means of said central control station generates the binary signal representative of the sensor states by comparing the level transitions brought about in said clock-pulse superposed voltage signal by said modulation with the outputs of said sensors with a predetermined reference voltage level at said predetermined timing.

* * * * *